United States Patent
Whitney et al.

(10) Patent No.: US 7,748,362 B2
(45) Date of Patent: Jul. 6, 2010

(54) MANAGING LEAN AIR/FUEL TRANSIENTS IN COORDINATED TORQUE CONTROL

(75) Inventors: Christopher E. Whitney, Highland, MI (US); Michael S. Emmorey, Brighton, MI (US); Jeffrey M. Kaiser, Highland, MI (US); Robert C. Simon, Jr., Brighton, MI (US); Cheryl A. Williams, Howell, MI (US); Jon C. Wasberg, Davison, MI (US); Eric Ferch, Northville, MI (US); Craig M. Sawdon, Williamston, MI (US)

(73) Assignee: GM Global Technology Operations, Inc.

( * ) Notice: Subject to any disclaimer, the term of this patent is extended or adjusted under 35 U.S.C. 154(b) by 0 days.

(21) Appl. No.: 12/437,193

(22) Filed: May 7, 2009

(65) Prior Publication Data

US 2009/0283070 A1 Nov. 19, 2009

Related U.S. Application Data

(60) Provisional application No. 61/051,580, filed on May 8, 2008.

(51) Int. Cl.
*F02P 5/15* (2006.01)
(52) U.S. Cl. .................. 123/406.23; 123/406.25; 123/406.44; 123/406.46; 123/406.51; 123/406.54; 123/406.55

(58) Field of Classification Search ............. 123/339.11, 123/406.23, 406.25, 406.44, 406.45, 406.46, 123/406.51, 406.54, 406.55, 676, 685
See application file for complete search history.

(56) References Cited

U.S. PATENT DOCUMENTS

| 5,626,117 | A * | 5/1997 | Wright et al. ........... 123/406.55 |
| 6,135,087 | A * | 10/2000 | DeGeorge et al. ...... 123/406.52 |
| 6,715,280 | B2 * | 4/2004 | Lewis et al. .................... 60/274 |
| 6,751,948 | B2 * | 6/2004 | Takemura et al. ............. 60/284 |
| 7,104,043 | B2 * | 9/2006 | Zhu et al. ....................... 60/284 |
| 2003/0221664 | A1 * | 12/2003 | Surnilla ................. 123/339.11 |

* cited by examiner

*Primary Examiner*—Erick Solis

(57) ABSTRACT

An engine control system includes an air control module, a spark control module, a torque control module, a transient detection module, and a launch torque module. The air control module controls a throttle valve of an engine based on a commanded predicted torque. The spark control module controls spark advance of the engine based on a commanded immediate torque. The torque control module increases the commanded predicted torque when a catalyst light-off (CLO) mode is active, and increases the commanded immediate torque when a driver actuates an accelerator input. The transient detection module generates a lean transient signal when an air per cylinder increase is detected while the CLO mode is active. The launch torque module generates a torque offset signal based on the lean transient signal. The torque control module increases the commanded immediate torque based on the torque offset signal.

20 Claims, 8 Drawing Sheets

MANAGING LEAN AIR/FUEL TRANSIENTS IN COORDINATED TORQUE CONTROL

CROSS-REFERENCE TO RELATED APPLICATIONS

This application claims the benefit of U.S. Provisional Application No. 61/051,580, filed on May 8, 2008. The disclosure of the above application is incorporated herein by reference.

FIELD

The present disclosure relates to engine controls systems and methods, and more particularly to systems and methods for identifying and managing lean air/fuel transients using coordinated torque control.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into gasoline engines is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the amount of air and fuel provided to the cylinders increases the torque output of the engine.

Engine control systems have been developed to control engine torque output to achieve a desired torque. Traditional engine control systems, however, do not control the engine torque output as accurately as desired. Further, traditional engine control systems do not provide a rapid response to control signals or coordinate engine torque control among various devices that affect the engine torque output.

SUMMARY

An engine control system includes an air control module, a spark control module, a torque control module, a transient detection module, and a launch torque module. The air control module controls a throttle valve of an engine based on a commanded predicted torque. The spark control module controls spark advance of the engine based on a commanded immediate torque. The torque control module increases the commanded predicted torque when a catalyst light-off (CLO) mode is active, and increases the commanded immediate torque when a driver actuates an accelerator input. The transient detection module generates a lean transient signal when an air per cylinder increase is detected while the CLO mode is active. The launch torque module generates a torque offset signal based on the lean transient signal. The torque control module increases the commanded immediate torque based on the torque offset signal.

A method includes controlling a throttle valve of an engine based on a commanded predicted torque; controlling spark advance of the engine based on a commanded immediate torque; increasing the commanded predicted torque when a catalyst light-off (CLO) mode is active; increasing the commanded immediate torque when a driver actuates an accelerator input; generating a lean transient signal when an air per cylinder increase is detected while the CLO mode is active; generating a torque offset signal based on the lean transient signal; and increasing the commanded immediate torque based on the torque offset signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
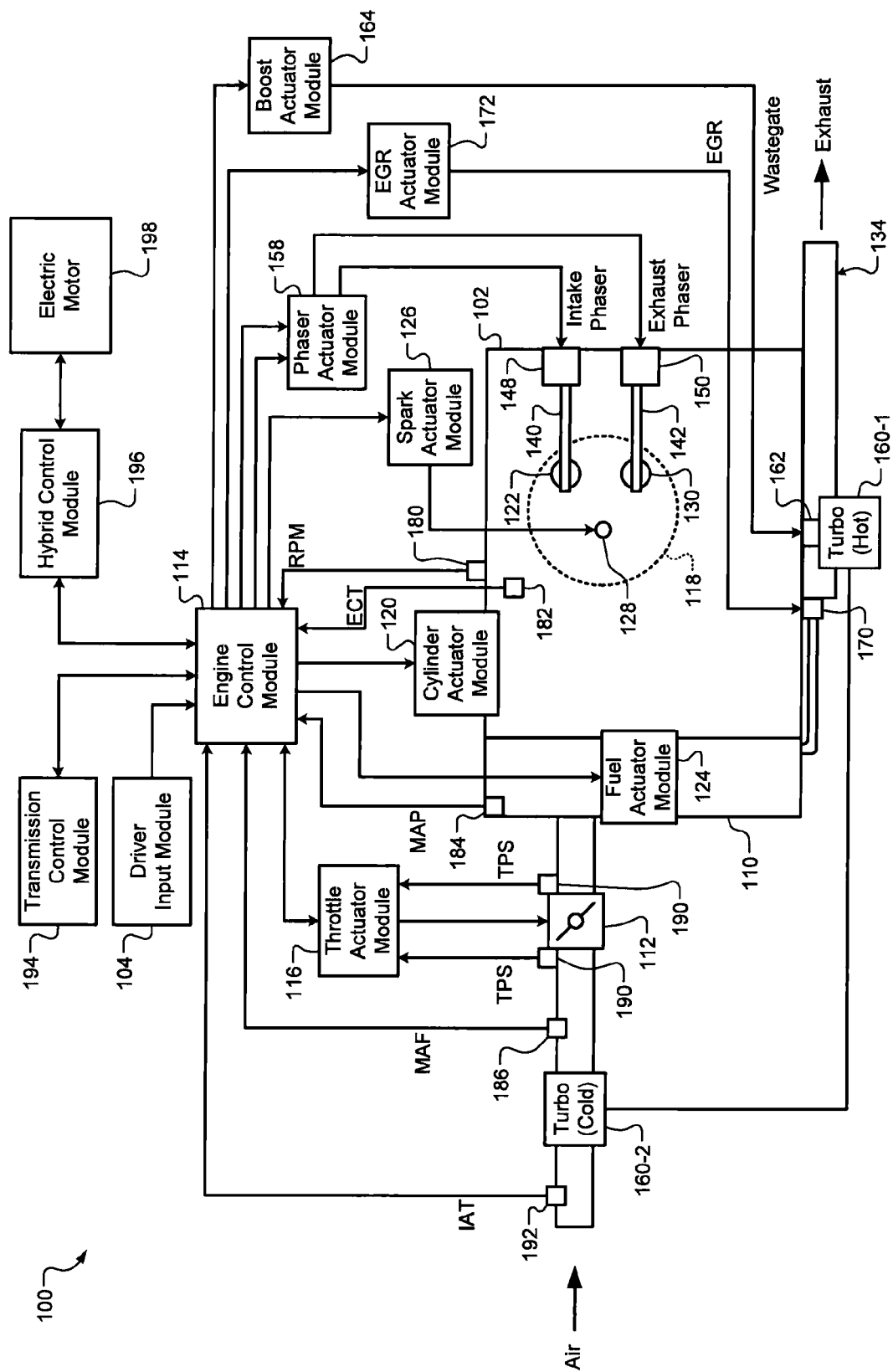
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

When a cold engine is started, one or more catalyst systems in the engine's exhaust system will begin warming up. Until fully warmed up, the catalyst system may be less effective in reducing tailpipe emissions resulting from engine combustion events. Therefore, a catalyst light-off mode may be used to more rapidly raise the catalyst system to a temperature where the catalyst operates effectively. The catalyst light-off mode may include creating a large spark retard.

Spark timing for each cylinder firing cycle is measured with respect to top dead center of the cylinder for which the spark is being generated. Spark advance is a measure of how much prior to top dead center the spark will be generated, often expressed in degrees of crankshaft rotation. A negative spark advance means that the spark is generated after the cylinder reaches top dead center. A spark advance value that produces the greatest engine torque output is calibrated for various engine operating conditions. Creating a spark retard means reducing the spark advance form the calibrated spark advance value. In other words, retarding (delaying) the spark causes the spark to occur later in time for each cylinder firing cycle and reduces engine torque output.

In order to maintain a desired idle speed, the engine may produce a first level of torque. Retarding the spark timing may reduce the engine's output below the first level of torque, possibly leading to a rough idle or even an engine stall. Therefore, the decrease in torque due to spark retard may be offset by an action that increases torque, such as increasing air flow into the engine by opening a throttle valve. The increased air flow may be introduced at the same time as the spark retard in order to maintain the first level of torque from the engine.

The amount of spark advance can be changed quickly. For example, a changed spark advance may be realized during the next cylinder firing cycle. In contrast, changing air flow in the engine is done by mechanically moving a throttle valve and waiting for increased air flow to reach and be combusted in the cylinders, which takes many cylinder firing cycles.

The amount of torque produced by the current air flow and the current spark advance is the actual torque output of the engine. The amount of torque that could be produced at the current air flow by using a calibrated spark advance and fueling all cylinders is called air torque. The desired air torque of the engine may be determined by a predicted torque request, while the desired actual torque of the engine may be determined by an immediate torque request. The difference between the air torque and the actual torque is called a torque reserve. When a torque reserve is present, the engine torque output can be quickly increased from the actual torque to the air torque by returning spark advance to the calibrated value.

In catalyst light-off mode, the large spark retard may be produced by making a high predicted torque request while leaving the immediate torque request at the first torque level, which maintains the engine's idle speed. Although the high predicted torque request causes an increase in air flow, keeping the immediate torque request at the first torque level causes the spark to be retarded.

When the driver tips in (actuates an accelerator input, such as a pedal), the engine increases torque output to accelerate the vehicle based on the driver input. If the driver tips in while the engine is in catalyst light-off mode, the spark retard may be removed to increase the torque output of the engine. To prevent the driver from detecting a jerky response, the spark retard may be phased out over time instead of being abruptly reduced. The spark retard may be reduced by slowly increasing the immediate torque request.

When the driver tips in and the spark retard is phased out, there may no longer be enough spark retard, effectively cancelling catalyst light-off mode. To reduce emissions, catalyst light-off mode may be re-entered as soon as possible. To re-enter catalyst light-off mode, the spark retard is created by re-establishing the previous torque reserve. Therefore, as the immediate torque request is increasing to provide the driver with the requested torque for acceleration, the predicted torque request may be increased as well to maintain the torque reserve.

By increasing the predicted torque request, the throttle valve opens to increase air flow and increase the air torque of the engine. When various components of the engine are cold and air flow suddenly increases, the models used to determine a stoichiometric amount of fuel for fuel injection may be inaccurate. For example, models relating to fuel evaporation, cylinder wall wetting, and air flow estimation may produce inaccurate results. This may result in less fuel being injected than what is necessary to achieve a stoichiometric air/fuel ratio, leading to a lean air/fuel transient.

The lean air/fuel ratio during the lean air/fuel transient causes slower flame fronts in the cylinders during combustion. Because the flame fronts are slower, the spark advance should be increased beyond the calibrated spark advance to allow extra time for the flame fronts to propagate. Therefore, the immediate torque request may be increased to the air torque to remove the spark retard, and a spark offset may be applied to increase the spark advance beyond the calibrated spark advance.

Applying the spark offset above the calibrated spark advance may be performed based on detection of an air per cylinder transient, even when not in catalyst light-off mode. However, because catalyst light-off mode is performed when the engine is starting, and therefore cold, lean air/fuel transients may be more frequent during catalyst light-off mode. During catalyst light-off mode, a large spark retard is present. In order to increase the spark advance beyond the calibrated value, the spark retard is first removed, returning the spark advance to the calibrated value, and then the offset is applied. This may result in a large change in spark advance.

Because the spark retard for catalyst light-off is large, the amount the immediate torque request is increased during a lean air/fuel transient may also be large. Therefore, when a lean air/fuel transient is expected during catalyst light-off mode, the engine control module may halt catalyst light-off mode and begin ramping up the immediate torque request. This reduces the jump in the immediate torque request that will occur when the lean air/fuel transient is detected and the spark retard is removed by increasing the immediate torque request.

After the lean air/fuel transient is over, the immediate torque request can be returned to the level of torque necessary to provide the driver-requested acceleration. Also, the spark offset amount can be removed from the spark advance. The predicted torque request may be maintained at a substantially higher level than the immediate torque request. This creates a large spark retard, which allows catalyst light-off mode to resume.

Referring now to FIG. 1, a functional block diagram of an exemplary engine system 100 is presented. The engine system 100 includes an engine 102 that combusts an air/fuel mixture to produce drive torque for a vehicle based on a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

Air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations not depicted in FIG. 1, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The spark actuator module 126 may be controlled by a timing signal indicating how far before or after TDC the spark should be provided. Operation of the spark actuator module 126 may therefore be synchronized with crankshaft rotation. In various implementations, the spark actuator module 126 may halt provision of spark to deactivated cylinders.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate the cylinder 118 by disabling opening of the intake valve 122 and/or the exhaust valve 130.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. When implemented, variable valve lift may also be controlled by the phaser actuator module 158.

The engine system 100 may include a boost device that provides pressurized air to the intake manifold 110. For example, FIG. 1 shows a turbocharger 160 that includes a hot turbine 160-1 that is powered by hot exhaust gases flowing through the exhaust system 134. The turbocharger 160 also includes a cold air compressor 160-2, driven by the turbine 160-1, that compresses air leading into the throttle valve 112. In various implementations, a supercharger, driven by the crankshaft, may compress air from the throttle valve 112 and deliver the compressed air to the intake manifold 110.

A wastegate 162 may allow exhaust gas to bypass the turbocharger 160, thereby reducing the boost (the amount of intake air compression) of the turbocharger 160. The ECM 114 controls the turbocharger 160 via a boost actuator module 164. The boost actuator module 164 may modulate the boost of the turbocharger 160 by controlling the position of the wastegate 162. In various implementations, multiple turbochargers may be controlled by the boost actuator module 164. The turbocharger 160 may have variable geometry, which may be controlled by the boost actuator module 164.

An intercooler (not shown) may dissipate some of the compressed air charge's heat, which is generated as the air is compressed. The compressed air charge may also have absorbed heat because of the air's proximity to the exhaust system 134. Although shown separated for purposes of illustration, the turbine 160-1 and the compressor 160-2 are often attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger 160. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting the angle of the blade of the throttle valve 112.

Similarly, the spark actuator module 126 may be referred to as an actuator, while the corresponding actuator value may be the amount of spark advance relative to cylinder TDC. Other actuators may include the boost actuator module 164, the EGR actuator module 172, the phaser actuator module 158, the fuel actuator module 124, and the cylinder actuator module 120. For these actuators, the actuator values may correspond to boost pressure, EGR valve opening area, intake and exhaust cam phaser angles, fueling rate, and number of cylinders activated, respectively. The ECM 114 may control actuator values in order to generate a desired torque from the engine 102.

Figure 2:
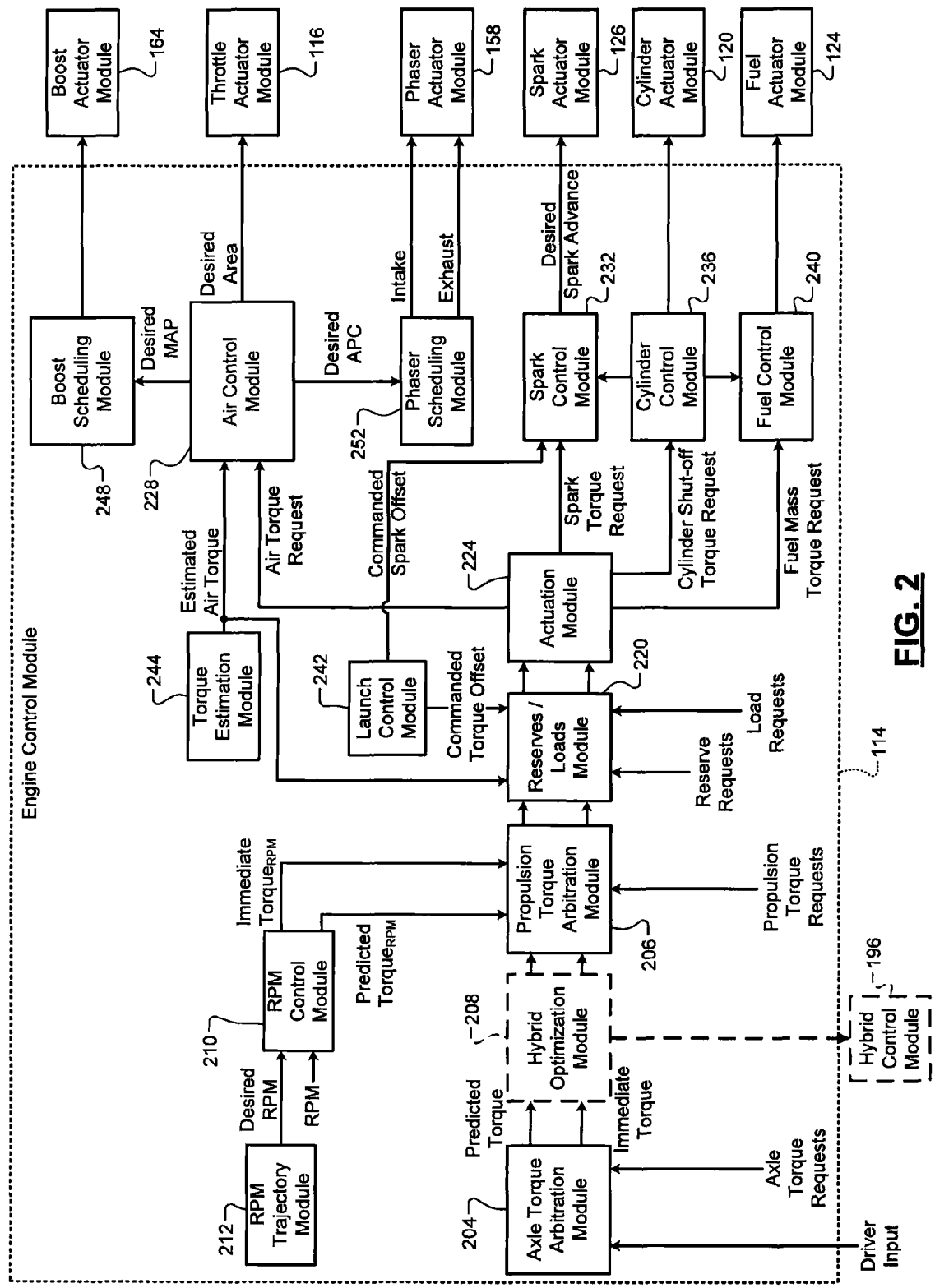
FIG. 2 is a functional block diagram of an exemplary engine control system according to the principles of the present disclosure.

Referring now to FIG. 2, a functional block diagram of an exemplary engine control system is presented. An exemplary implementation of the ECM 114 includes an axle torque arbitration module 204. The axle torque arbitration module 204 arbitrates between a driver input from the driver input module 104 and other axle torque requests. For example, the driver input may be based on position of an accelerator pedal. The driver input may also be based on cruise control, which may be an adaptive cruise control system that varies vehicle speed to maintain a predetermined following distance.

Torque requests may include target torque values as well as ramp requests, such as a request to ramp torque down to a minimum engine off torque or to ramp torque up from the minimum engine off torque. Axle torque requests may include a torque reduction requested during wheel slip by a traction control system. Axle torque requests may also include torque request increases to counteract negative wheel slip, where a tire of the vehicle slips with respect to the road surface because the axle torque is negative.

Axle torque requests may also include brake management requests and vehicle over-speed torque requests. Brake management requests may reduce engine torque to ensure that the engine torque output does not exceed the ability of the brakes to hold the vehicle when the vehicle is stopped. Vehicle over-speed torque requests may reduce the engine torque output to prevent the vehicle from exceeding a predetermined speed. Axle torque requests may also be made by body stability control systems.

The axle torque arbitration module 204 outputs a predicted torque and an immediate torque based on the results of arbitrating between the received torque requests. The predicted torque is the amount of torque that the ECM 114 prepares the engine 102 to generate, and may often be based on the driver's torque request. The immediate torque is the amount of currently desired torque, which may be less than the predicted torque.

The immediate torque may be less than the predicted torque to provide torque reserves, as described in more detail below, and to meet temporary torque reductions. For example only, temporary torque reductions may be requested when a vehicle speed is approaching an over-speed threshold and/or when the traction control system senses wheel slippage.

The immediate torque may be achieved by varying engine actuators that respond quickly, while slower engine actuators may be used to prepare for the predicted torque. For example, in a gas engine, spark advance may be adjusted quickly, while air flow and cam phaser position may be slower to respond because of mechanical lag time. Further, changes in air flow are subject to air transport delays in the intake manifold. In addition, changes in air flow are not manifested as torque variations until air has been drawn into a cylinder, compressed, and combusted.

A torque reserve may be created by setting slower engine actuators to produce a predicted torque, while setting faster engine actuators to produce an immediate torque that is less than the predicted torque. For example, the throttle valve 112 can be opened, thereby increasing air flow and preparing to produce the predicted torque. Meanwhile, the spark advance may be reduced (in other words, spark timing may be retarded), reducing the actual engine torque output to the immediate torque.

The difference between the predicted and immediate torques may be called the torque reserve. When a torque reserve is present, the engine torque can be quickly increased from the immediate torque to the predicted torque by changing a faster actuator. The predicted torque is thereby achieved without waiting for a change in torque to result from an adjustment of one of the slower actuators.

The axle torque arbitration module 204 may output the predicted torque and the immediate torque to a propulsion torque arbitration module 206. In various implementations, the axle torque arbitration module 204 may output the predicted torque and immediate torque to a hybrid optimization module 208. The hybrid optimization module 208 determines how much torque should be produced by the engine 102 and how much torque should be produced by the electric motor 198. The hybrid optimization module 208 then outputs modified predicted and immediate torque values to the propulsion torque arbitration module 206. In various implementations, the hybrid optimization module 208 may be implemented in the hybrid control module 196.

The predicted and immediate torques received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests, including the converted predicted and immediate torques. The propulsion torque arbitration module 206 may generate an arbitrated predicted torque and an arbitrated immediate torque. The arbitrated torques may be generated by selecting a winning request from among received requests. Alternatively or additionally, the arbitrated torques may be generated by modifying one of the received requests based on another one or more of the received requests.

Other propulsion torque requests may include torque reductions for engine over-speed protection, torque increases for stall prevention, and torque reductions requested by the transmission control module 194 to accommodate gear shifts. Propulsion torque requests may also result from clutch fuel cutoff, which may reduce the engine torque output when the driver depresses the clutch pedal in a manual transmission vehicle.

Propulsion torque requests may also include an engine shutoff request, which may be initiated when a critical fault is detected. For example only, critical faults may include detection of vehicle theft, a stuck starter motor, electronic throttle control problems, and unexpected torque increases. For example only, engine shutoff requests may always win arbitration, thereby being output as the arbitrated torques, or may bypass arbitration altogether, simply shutting down the engine. The propulsion torque arbitration module 206 may still receive these shutoff requests so that, for example, appropriate data can be fed back to other torque requesters. For example, all other torque requestors may be informed that they have lost arbitration.

An RPM control module 210 may also output predicted and immediate torque requests to the propulsion torque arbitration module 206. The torque requests from the RPM control module 210 may prevail in arbitration when the ECM 114 is in an RPM mode. RPM mode may be selected when the driver removes their foot from the accelerator pedal, such as when the vehicle is idling or coasting down from a higher speed. Alternatively or additionally, RPM mode may be selected when the predicted torque requested by the axle torque arbitration module 204 is less than a calibratable torque value.

The RPM control module 210 receives a desired RPM from an RPM trajectory module 212, and controls the predicted and immediate torque requests to reduce the difference between the desired RPM and the actual RPM. For example only, the RPM trajectory module 212 may output a linearly decreasing desired RPM for vehicle coastdown until an idle RPM is reached. The RPM trajectory module 212 may then continue outputting the idle RPM as the desired RPM.

A reserves/loads module 220 receives the arbitrated predicted and immediate torque requests from the propulsion torque arbitration module 206. Various engine operating conditions may affect the engine torque output. In response to these conditions, the reserves/loads module 220 may create a torque reserve by increasing the predicted torque request.

For example only, a catalyst light-off process or a cold start emissions reduction process may require retarded spark advance. The reserves/loads module 220 may therefore increase the predicted torque request above the immediate torque request to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, corresponding torque reserves may be requested in order to create a spark retard. The spark retard can be removed to allow a quick response to decreases in engine torque output that result from leaning the air/fuel mixture during these processes.

The reserves/loads module 220 may also create a reserve in anticipation of a future load, such as power steering pump operation or engagement of an air conditioning (WC) compressor clutch. The reserve for A/C clutch engagement may be created when the driver first requests air conditioning. Then, when the A/C clutch engages, the reserves/loads module 220 may add the expected load of the A/C clutch to the immediate torque request.

An actuation module 224 receives the predicted and immediate torque requests from the reserves/loads module 220. The actuation module 224 determines how the predicted and immediate torque requests will be achieved. The actuation module 224 may be engine type specific, with different control schemes for gas engines versus diesel engines. In various implementations, the actuation module 224 may define the boundary between modules prior to the actuation module 224, which are engine independent, and modules that are engine dependent.

For example, in a gas engine, the actuation module 224 may vary the opening of the throttle valve 112, which allows for a wide range of torque control. However, opening and closing the throttle valve 112 results in a relatively slow change in torque. Disabling cylinders also provides for a wide range of torque control, but may be similarly slow and additionally involve drivability and emissions concerns. Changing spark advance is relatively fast, but does not provide as much range of torque control. In addition, the amount of torque control possible with spark (referred to as spark capacity) changes as the air per cylinder changes.

In various implementations, the actuation module 224 may generate an air torque request based on the predicted torque request. The air torque request may be equal to the predicted torque request, causing air flow to be set so that the predicted torque request can be achieved by changes to other actuators.

An air control module 228 may determine desired actuator values for slow actuators based on the air torque request. For example, the air control module 228 may control desired manifold absolute pressure (MAP), desired throttle area, and/or desired air per cylinder (APC). Desired MAP may be used to determine desired boost, and desired APC may be used to determine desired cam phaser positions. In various implementations, the air control module 228 may also determine an amount of opening of the EGR valve 170.

In gas systems, the actuation module 224 may also generate a spark torque request, a cylinder shut-off torque request, and a fuel mass torque request. The spark torque request may be used by a spark control module 232 to determine how much to retard the spark (which reduces the engine torque output) from a calibrated spark advance.

The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of cylinders may be deactivated jointly. The cylinder control module 236 may also instruct a fuel control module 240 to stop providing fuel for deactivated cylinders and may instruct the spark control module 232 to stop providing spark for deactivated cylinders.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel mass torque request may be used by the fuel control module 240 to vary the amount of fuel provided to each cylinder. For example only, the fuel control module 240 may determine a fuel mass that, when combined with the current amount of air per cylinder, yields stoichiometric combustion. The fuel control module 240 may instruct the fuel actuator module 124 to inject this fuel mass for each activated cylinder. During normal engine operation, the fuel control module 240 may attempt to maintain a stoichiometric air/fuel ratio.

The fuel control module 240 may increase the fuel mass above the stoichiometric value to increase engine torque output and may decrease the fuel mass to decrease engine torque output. In various implementations, the fuel control module 240 may receive a desired air/fuel ratio that differs from stoichiometry. The fuel control module 240 may then determine a fuel mass for each cylinder that achieves the desired air/fuel ratio. In diesel systems, fuel mass may be the primary actuator for controlling engine torque output.

The approach the actuation module 224 takes in achieving the immediate torque request may be determined by a mode setting. The mode setting may be provided to the actuation module 224, such as by the propulsion torque arbitration module 206, and may select modes including an inactive mode, a pleasible mode, a maximum range mode, and an auto actuation mode.

In the inactive mode, the actuation module 224 may ignore the immediate torque request and attempt to achieve the predicted torque request. The actuation module 224 may therefore set the spark torque request, the cylinder shut-off torque request, and the fuel mass torque request to the predicted torque request, which maximizes torque output for the current engine air flow conditions. Alternatively, the actuation module 224 may set these requests to predetermined (such as out-of-range high) values to disable torque reductions from retarding spark, deactivating cylinders, or reducing the fuel/air ratio.

In the pleasible mode, the actuation module 224 may attempt to achieve the immediate torque request by adjusting only spark advance. The actuation module 224 may therefore output the predicted torque request as the air torque request and the immediate torque request as the spark torque request. The spark control module 232 will retard the spark as much as possible to attempt to achieve the spark torque request. If the desired torque reduction is greater than the spark reserve capacity (the amount of torque reduction achievable by spark retard), the torque reduction may not be achieved.

In the maximum range mode, the actuation module 224 may output the predicted torque request as the air torque request and the immediate torque request as the spark torque request. In addition, the actuation module 224 may generate a cylinder shut-off torque request that is low enough to enable the spark control module 232 to achieve the immediate torque request. In other words, the actuation module 224 may decrease the cylinder shut-off torque request (thereby deactivating cylinders) when reducing spark advance alone is unable to achieve the immediate torque request.

In the auto actuation mode, the actuation module 224 may decrease the air torque request based on the immediate torque request. For example, the air torque request may be reduced only so far as is necessary to allow the spark control module 232 to achieve the immediate torque request by adjusting spark advance. Therefore, in auto actuation mode, the immediate torque request is achieved while allowing the engine 102 to return to the predicted torque request as quickly as possible. In other words, the use of relatively slowly-responding throttle valve corrections is minimized by reducing the quickly-responding spark advance as much as possible.

The reserves/loads module 220 may receive a commanded torque offset from a launch control module 242. The reserves/loads module 220 may increase the commanded immediate torque based on this commanded torque offset. The launch control module 242 may also generate a commanded spark offset. The spark control module 232 may increase spark advance based on the commanded spark offset.

A torque estimation module 244 may estimate torque output of the engine 102. This estimated torque may be used by the air control module 228 to perform closed-loop control of engine air flow parameters, such as throttle area, MAP, and phaser positions. For example only, a torque relationship such as $$T=f(APC,S,I,E,AF,OT,\#) \quad (1)$$

may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may be accounted for, such as the degree of opening of an exhaust gas recirculation (EGR) valve.

This relationship may be modeled by an equation and/or may be stored as a lookup table. The torque estimation module 244 may determine APC based on measured MAF and current RPM, thereby allowing closed loop air control based on actual air flow. The intake and exhaust cam phaser positions used may be based on actual positions, as the phasers may be traveling toward desired positions.

While the actual spark advance may be used to estimate torque, when a calibrated spark advance value is used to estimate torque, the estimated torque may be called an estimated air torque. The estimated air torque is an estimate of how much torque the engine could generate at the current air flow if spark retard was removed (i.e., spark advance was set to the calibrated spark advance value) and all cylinders were being fueled.

The air control module 228 may generate a desired manifold absolute pressure (MAP) signal, which is output to a boost scheduling module 248. The boost scheduling module 248 uses the desired MAP signal to control the boost actuator module 164. The boost actuator module 164 then controls one or more turbochargers and/or superchargers.

The air control module 228 may generate a desired area signal, which is output to the throttle actuator module 116. The throttle actuator module 116 then regulates the throttle valve 112 to produce the desired throttle area. The air control module 228 may generate the desired area signal based on an inverse torque model and the air torque request. The air control module 228 may use the estimated air torque and/or the MAF signal in order to perform closed loop control. For example, the desired area signal may be controlled to minimize a difference between the estimated air torque and the air torque request.

The air control module 228 may also generate a desired air per cylinder (APC) signal, which is output to a phaser scheduling module 252. Based on the desired APC signal and the RPM signal, the phaser scheduling module 252 may control positions of the intake and/or exhaust cam phasers 148 and 150 using the phaser actuator module 158.

Referring back to the spark control module 232, spark advance values may be calibrated at various engine operating conditions. For example only, a torque relationship may be inverted to solve for desired spark advance. For a given torque request ($T_{des}$), the desired spark advance ($S_{des}$) may be determined based on $$S_{des}=T^{-1}(T_{des},APC,I,E,AF,OT,\#). \quad (2)$$

This relationship may be embodied as an equation and/or as a lookup table. The air/fuel ratio (AF) may be the actual ratio, as indicated by the fuel control module 240.

When the spark advance is set to the calibrated spark advance, the resulting torque may be as close to mean best torque (MBT) as possible. MBT refers to the maximum torque that is generated for a given air flow as spark advance is increased, while using fuel having an octane rating greater than a predetermined threshold and using stoichiometric fueling. The spark advance at which this maximum torque occurs may be referred to as MBT spark. The calibrated spark advance may differ from MBT spark because of, for example, fuel quality (such as when lower octane fuel is used) and environmental factors. The torque at the calibrated spark advance may therefore be less than MBT.

Figure 3:
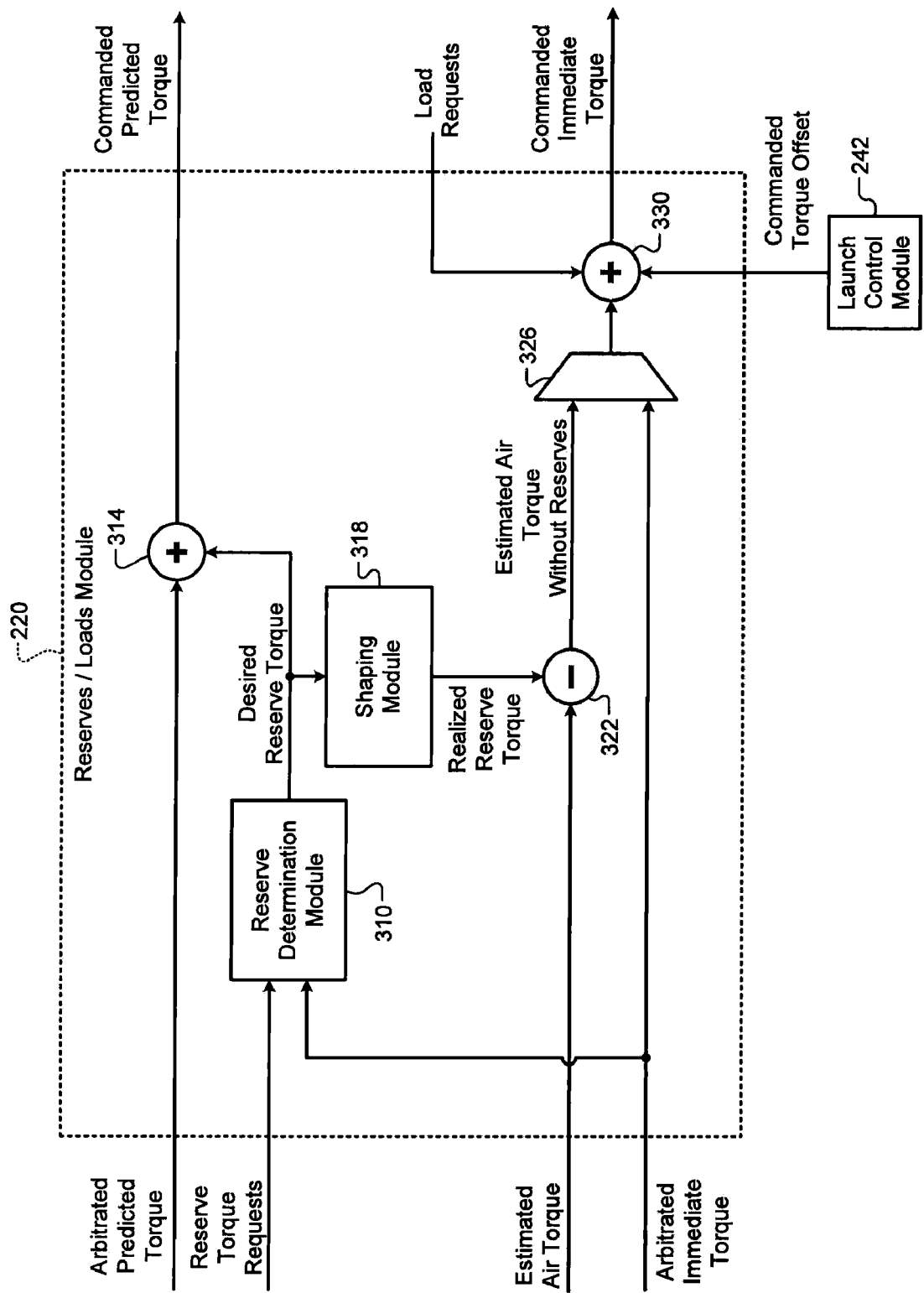
FIG. 3 is a functional block diagram of an exemplary implementation of the torque reserve module of FIG. 2 according to the principles of the present disclosure.

Referring now to FIG. 3, a functional block diagram of an exemplary implementation of the reserves/loads module 220 of FIG. 2 is presented. A reserve determination module 310 receives reserve torque requests. For example only, reserve torque requests may include requests related to idling, traction control, and transmission control. Reserve torque requests may be communicated through the arbitrated predicted and immediate torque requests. Other reserve torque requests may be made for regenerating a catalyst of the exhaust system 134 of FIG. 1 and/or in preparation for engaging the air conditioning compressor clutch or a generator (e.g., alternator or belt alternator starter).

The reserve determination module 310 determines a desired reserve torque based on the reserve torque requests and the difference between the arbitrated predicted and immediate torques. For example only, the desired reserve torque may be determined based on the reserve torque request having the largest magnitude. Alternatively, the desired reserve torque may be determined as a sum of one or more of the reserve torque requests. A first summing module 314 adds the desired reserve torque to the arbitrated predicted torque from the propulsion torque arbitration module 206 of FIG. 2 to generate the commanded predicted torque. The commanded predicted torque is transmitted to the actuation module 224 of FIG. 2.

A shaping module 318 applies a filter to the desired reserve torque to determine a realized reserve torque. For example only, the filter may include a manifold model that represents delay between a throttle being opened as a result of the desired reserve torque and the actual realization of increased torque as the result of increased air flow. The realized reserve torque represents how much of the desired reserve torque has been realized.

For example only, the manifold model may incorporate mechanical delay, air transport delay, and combustion delay. Mechanical delay may include the time it takes for the throttle valve to physically open to the desired position. Air transport delay may include a delay between the throttle valve opening and increased air flow reaching the cylinders. Combustion delay may include a delay between increased air flow reaching the cylinders and the combustion of the larger amount of air, when the torque increase is realized.

A difference module 322 subtracts the realized reserve torque from the estimated air torque to create an estimated air torque without reserves. A switching module 326 provides a selected input to a second summing module 330. When an immediate mode is selected, the switching module 326 outputs the arbitrated immediate torque from the propulsion torque arbitration module 206 of FIG. 2 to the second summing module 330. When a predicted mode is selected, the switching module 326 outputs the estimate air torque without reserves to the second summing module 330.

The second summing module 330 outputs a commanded immediate torque to the actuation module 224 of FIG. 2. The second summing module 330 may generate the commanded immediate torque by adding the output of the switching module 326, load reserve requests, and the commanded torque offset from the launch control module 242 of FIG. 2. The second summing module 330 may apply an upper limit to the commanded immediate torque, where the upper limit is based on the commanded predicted torque. The second summing module 330 may also rate limit the commanded immediate torque to prevent abrupt changes. The rate limit may cause the commanded immediate torque to transition from one value to another using a linear ramp.

Figure 4:
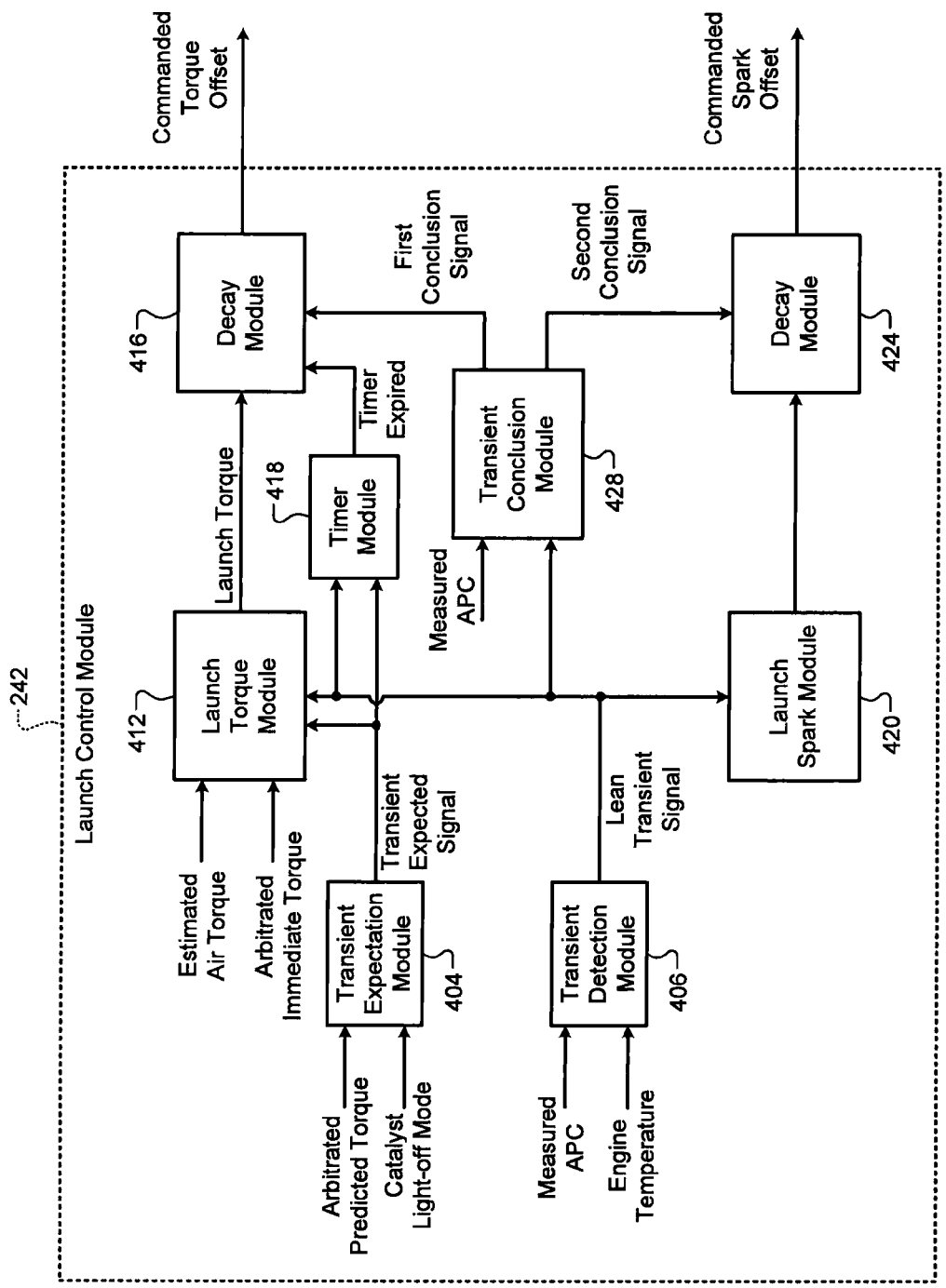
FIG. 4 is a functional block diagram of an exemplary implementation of the launch control module of FIG. 2 according to the principles of the present disclosure.

Referring now to FIG. 4, a functional block diagram of an exemplary implementation of the launch control module 242 is presented. A transient expectation module 404 determines when conditions likely to create lean air/fuel transients are present. For example only, the transient expectation module 404 may receive an indication of whether catalyst light-off mode is active.

When the driver tips in (presses on the accelerator pedal) during catalyst light-off, the arbitrated predicted torque request increases to prepare the engine for the acceleration requested by the driver. The commanded torque request may increase to follow the arbitrated predicted torque request, which may result in opening the throttle valve. Because of throttle movement, air transport, and combustion delays, the air per cylinder (APC) of the engine may not begin to increase immediately. The arbitrated torque request may be shaped and/or delayed so that the arbitrated torque request does not increase until engine APC changes.

The change in arbitrated predicted torque, when the engine temperature is below a threshold, may predict the occurrence of a lean air/fuel transient. For example only, the launch control module 242 may update computations at predetermined intervals of time. In various implementations, the predetermined intervals (or, loops) may be 12.5 milliseconds. The transient expectation module 404 may therefore output a transient expected signal when the arbitrated predicted torque increases by more than a predetermined amount from one loop to the next and catalyst light-off mode is active.

A transient detection module 406 monitors an air parameter, such as air flow or air per cylinder (APC). The transient detection module 406 may also receive an indication of engine temperature, such as engine coolant temperature. Lean air/fuel transients may be expected when the engine temperature is below a threshold. Alternatively, the transient detection module 406 may receive an indication of whether the catalyst light-off mode is active, because the catalyst light-off mode is active when the engine is starting, and therefore still cold.

When the air parameter increases and engine temperature is below a threshold, the transient detection module 406 generates a lean transient signal. For example only, the transient detection module 406 may generate the lean transient signal when APC increases by more than a predetermined amount from one loop to the next. APC may be calculated based on measured parameters, such as measured mass air flow (MAF) from the MAF sensor 186 of FIG. 1.

When the transient expected signal is generated, a launch torque module 412 begins ramping up a launch torque value from zero. The launch torque value may be incremented by a calculated value each loop. For example, the calculated value may be the greater of a predetermined value and a percentage of a launch capacity. In various implementations, the predetermined value may be 3 Nm and the percentage may be 12.5 percent. Launch capacity refers to the difference between the estimated air torque and the commanded immediate torque. The launch capacity may be limited to the difference between a torque security threshold and the commanded immediate torque when the torque security threshold is less than the estimated air torque.

The launch torque value is output by a first decay module 416 as the commanded torque offset to the reserves/loads module 220 of FIG. 2. A timer module 418 may be reset each time the transient expected signal is created. If the lean transient signal is not generated within a predetermined period after the transient expected signal, the timer module 418 generates a timer expired signal. The first decay module 416 may begin decaying the commanded torque offset to zero when the timer expired signal is received.

When the lean transient signal is generated, the launch torque module 412 outputs a launch torque value calculated to return the spark advance to the calibrated spark advance. For example only, the launch torque value may be set equal to the launch capacity.

The commanded torque offset is added to the arbitrated immediate torque by the reserves/loads module 220, as shown in FIG. 2. When the commanded immediate torque is increased to the estimated air torque, the spark advance is set to the calibrated optimum value, thereby removing the previous spark retard.

When the lean transient signal is generated, a launch spark module 420 outputs a launch spark value. The launch spark value is outputted as the commanded spark offset by a second decay module 424 to the spark control module 232 of FIG. 2. The commanded spark offset provides additional spark advance beyond the calibrated optimum value. This offset may compensate for inaccuracies in the calibrated spark advance because the calibrated spark advance is calibrated assuming stoichiometric fueling, which is not true during a lean air/fuel transient.

A transient conclusion module 428 generates a conclusion signal when the lean air/fuel transient has concluded. In various implementations, such as is shown in FIG. 4, a first conclusion signal is transmitted to the first decay module 416, while a second conclusion signal is transmitted to the second decay module 424. In this manner, the first and second conclusion signals can be generated at different times.

When the first conclusion signal is received, the first decay module 416 begins to decrease the commanded torque offset to zero. Similarly, when the second conclusion signal is received, the second decay module 424 decreases the commanded spark offset to zero. For example only, the first and second decay modules 416 and 424 may apply a linear or logarithmic decay. In various implementations, the first and second decay modules 416 and 424 may each apply logarithmic decays having different decay rates.

The transient conclusion module 428 may generate one or both of the conclusion signals when the estimated air torque or the measured air per cylinder stops increasing. Alternatively, the conclusion signals may be generated when a rate of change of either the estimated air torque or the measured APC falls below a predetermined threshold.

In various other implementations, the conclusion signals may be generated when the estimated air torque is within a predetermined range (or percentage) of the commanded predicted torque. Each of the conclusion signals may be generated based on a combination of one or more of the above factors. If other factors are absent, the transient conclusion module 428 may generate the conclusion signals a predetermined period of time after the lean transient signal was generated.

Figure 5:
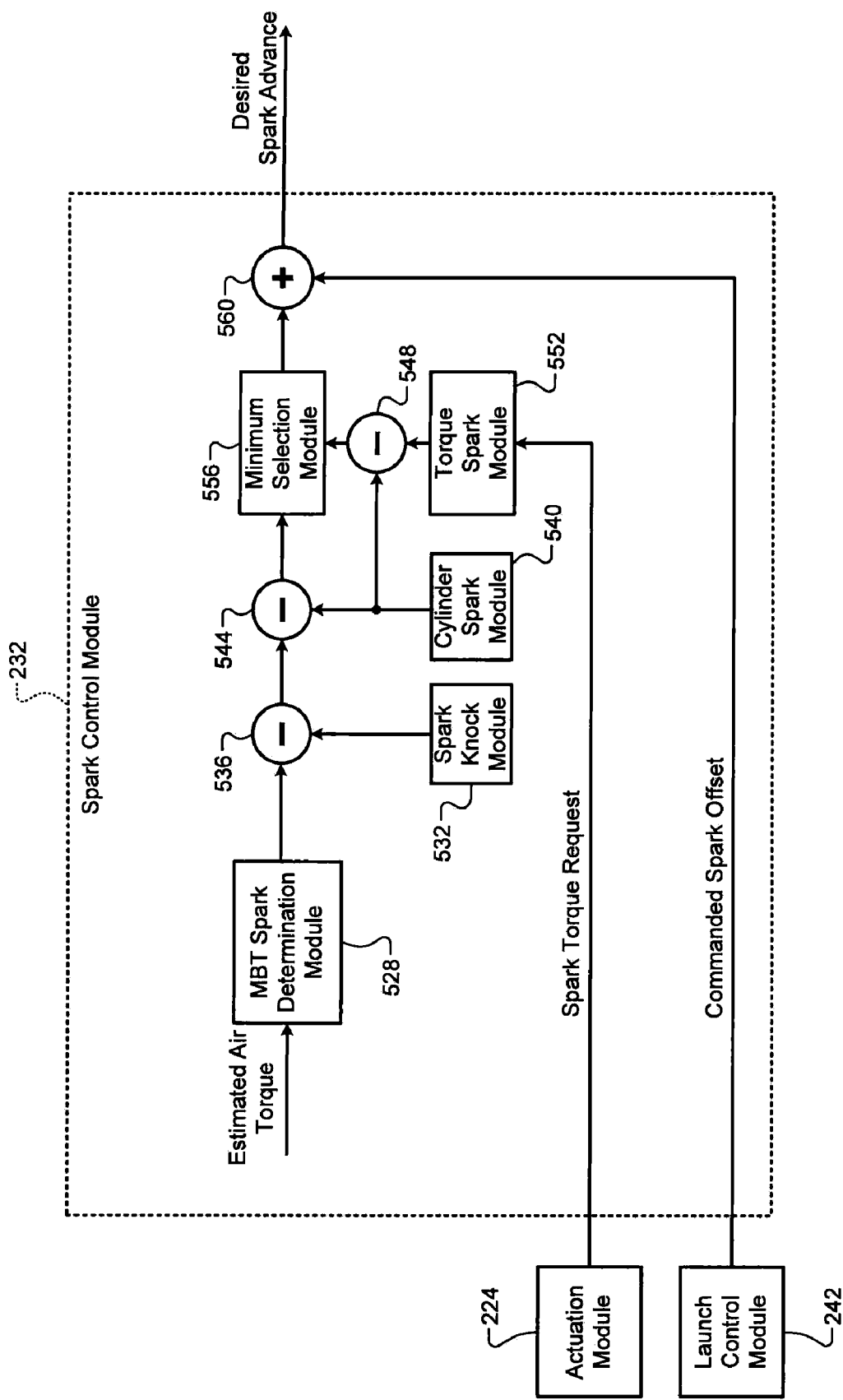
FIG. 5 is a functional block diagram of an exemplary implementation of a spark control module according to the principles of the present disclosure.

Referring now to FIG. 5, a functional block diagram of an exemplary implementation of the spark control module 232 is shown. A mean best torque (MBT) spark determination module 528 determines a theoretical MBT spark advance based on the estimated air torque. The MBT spark determination module 528 may store a set of calibrated values corresponding to, for example, different values of air flow.

For a given air flow, the calibrated MBT spark advance will generally produce the largest amount of torque from the engine. The MBT spark advance may be based on various assumptions, including that the fuel is sufficiently high octane to avoid knocking. However, because varying levels of octane fuel may be allowed, a spark knock module 532 is included.

The spark knock module 532 generates a spark value based on the presence of knock. As more knock is detected, the spark value provided by the spark knock module 532 may increase. The spark value generated by the spark knock module 532 is subtracted from the MBT spark by a difference module 536. In various other implementations, the spark knock module 532 may supply a maximum spark advance, and the difference module 536 would select the lower of the maximum spark advance and the MBT spark advance.

A cylinder spark module 540 outputs a value based upon cylinder deactivation. This spark value is received by difference modules 544 and 548. The difference module 544 subtracts the spark value from the cylinder spark module 540 from the value from the difference module 536. The difference module 548 subtracts the spark value from the cylinder spark module 540 from a spark advance received from a torque spark module 552.

The torque spark module 552 receives the spark torque request from the actuation module 224. The torque spark module 552 may calculate a spark advance that will cause the engine to produce a torque equal to the spark torque request. For example only, the torque spark module 552 may use an inverse torque model, such as described above with respect to FIG. 2. A minimum selection module 556 selects the lesser of the outputs of the difference modules 544 and 548. A summing module 560 adds the commanded spark offset from the launch control module 242 to the output of the minimum selection module 556. The output of the summing module 560 is transmitted to the spark actuator module 126 as the desired spark advance.

Figure 5A:
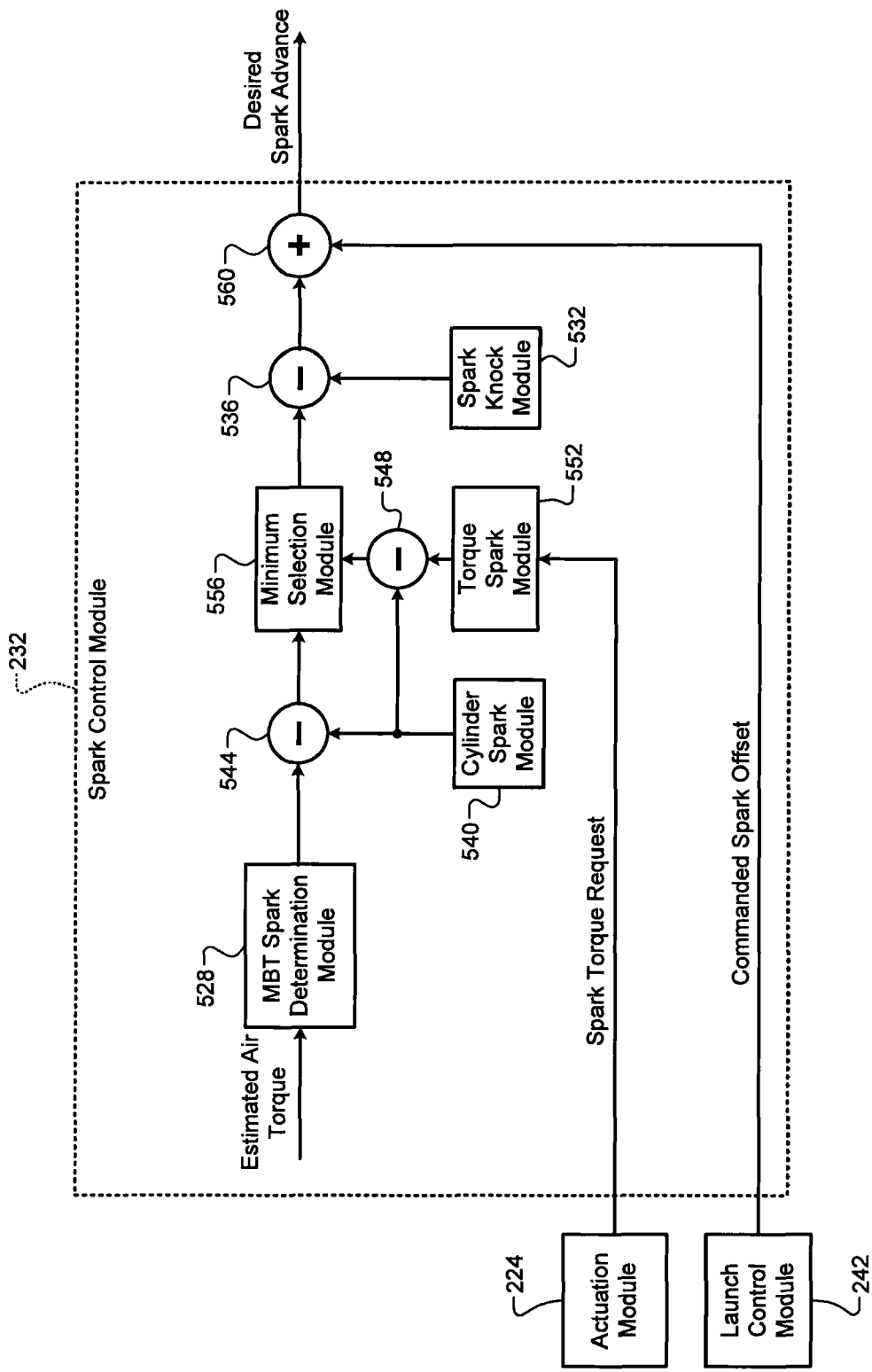
FIG. 5A is a functional block diagram of another exemplary implementation of the spark control module according to the principles of the present disclosure.

Referring now to FIG. 5A, an alternative exemplary implementation of the spark control module 232 is shown. In FIG. 5A, the spark knock module 532 and the difference module 536 are logically positioned after the minimum selection module 556 instead of before the difference module 544, as shown in FIG. 5.

Figure 6:
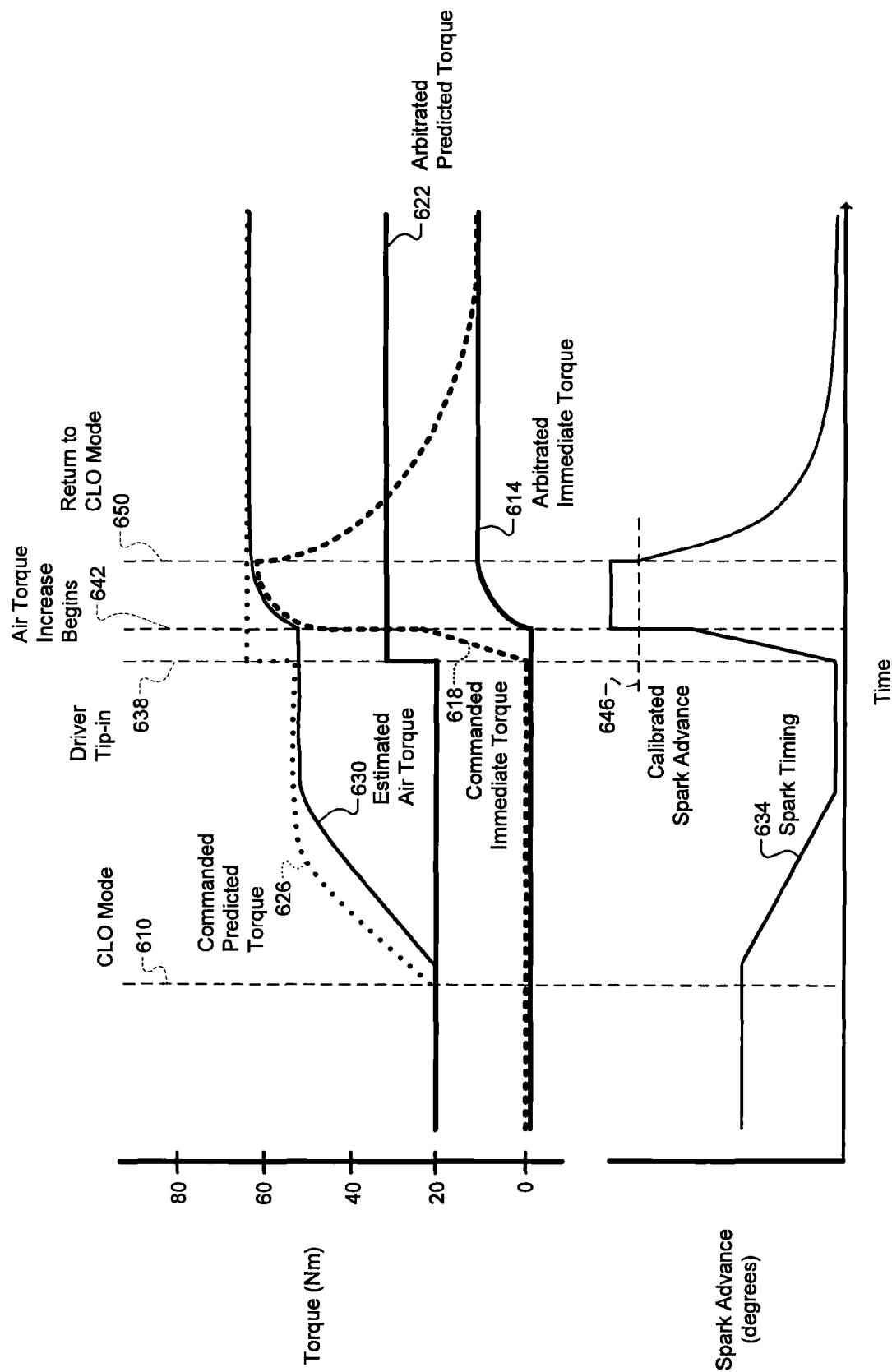
FIG. 6 is a chart depicting exemplary torque and spark advance traces for a situation where a driver tips in during catalyst light-off according to the principles of the present disclosure.

Referring now to FIG. 6, a chart depicts exemplary torque and spark advance traces for a situation where a driver tips in during catalyst light-off. Prior to time 610, a trace of arbitrated immediate torque 614 and a trace of commanded immediate torque 618 assume values of approximately 0 Newton-meters (Nm). A torque of 0 Nm may allow the engine to idle when there is negligible transmission load. A positive torque would cause the engine to speed up, while a negative torque would cause the engine to slow down.

Meanwhile a trace of arbitrated predicted torque 622 and commanded predicted torque 626 assume values of approximately 20 Nm. The 20 Nm difference between the commanded predicted torque 626 and the commanded immediate torque 618 is called a torque reserve. The torque reserve is created by increasing air flow while retarding the spark. Therefore, prior to time 610, there is sufficient air flow to produce 20 Nm of torque. However, because of spark retard, only 0 Nm of torque is actually produced by the engine.

The engine could rapidly transition to producing 20 Nm of torque by advancing the spark to a calibrated spark advance. The torque reserve may be present to prevent sudden torque demands, such as hydraulic power steering loads, from affecting engine idle. If a sudden torque demand is made, the actual engine torque output can be increased rapidly by advancing the spark without having to wait for increased air flow as a result of opening the throttle.

At time 610, catalyst light-off mode is initiated. In catalyst light-off mode, a large spark retard is created to raise the temperature of the catalyst, which allows the catalyst to reduce emissions as quickly as possible. In order to create the larger spark retard, the commanded predicted torque 626 is increased to approximately 50 Nm. The values, such as 50 Nm, in FIG. 6 are for purposes of illustration only. Although shown as a ramp, the commanded predicted torque 626 may be increased to the eventual plateau, such as 50 Nm, as a step function.

A trace of estimated air torque 630 is shown to lag the commanded predicted torque 626. This is because of mechanical delays in opening the throttle valve, air transport delays in greater air flow reaching the cylinders, and combustion delays for increased air to be combusted with corresponding increased fuel.

As the estimated air torque 630 increases, a trace of spark advance 634 is shown to be decreasing. The decreasing spark advance counteracts the increased air flow and causes the actual engine output to remain at approximately 0 Nm. At time 638, the spark retard for catalyst light-off has been achieved, and in this illustration, catalyst light-off is not yet completed.

At time 638, a driver tip-in occurs, such as by the driver pressing on the accelerator pedal. As a result of the driver input, the arbitrated predicted torque 622 increases to maintain the previous torque reserve. Similarly, the commanded predicted torque 626 increases by the same amount in order to maintain the spark retard used for catalyst light-off. The increase in the commanded predicted torque 626 causes the throttle valve to open to allow increased air flow.

The commanded immediate torque 618 is ramped toward the estimated air torque 630. The ramp (or other low-pass function) reduces the sudden increase in torque that will occur at time 642. The ramp of the commanded immediate torque 618 causes the spark advance to be increased (in other words, the spark retard is reduced). At time 642, the estimated air torque 630 begins to increase in response to the throttle valve opening initiated at time 638. Because the conditions for a lean air/fuel transient, such as an increase in air flow, are present at time 642, control may assume that a lean air/fuel transient is occurring.

Because of the lean air/fuel transient, the commanded immediate torque 618 is increased to follow the estimated air torque 630. By increasing the commanded immediate torque 618 to the estimated air torque 630, the spark retard is completely removed, setting the spark advance to a calibrated value that maximizes the amount of torque. In various implementations, a torque security threshold may establish an upper bound for the commanded immediate torque 618 that is less than the estimated air torque 630.

For example only, a calibrated optimum spark advance is indicated at 646. Although shown as a horizontal line, the calibrated spark advance 646 may vary with respect to air flow and other parameters. Therefore, the horizontal line at 646 may identify a calibrated spark advance that is valid only for the engine operating conditions present at time 642.

Normally, for given engine operating conditions, the calibrated spark advance 646 would produce the maximum torque output from the engine. However, because of the lean air/fuel transient, the calibrated spark advance 646 may be artificially low, because the calibrated spark advance 646 is calibrated assuming stoichiometric fueling. A spark advance offset may therefore be applied during a lean air/fuel transient. As shown in FIG. 6, the spark advance 634 therefore exceeds the calibrated spark advance 646 at time 642.

The arbitrated immediate torque 614 may being increasing at time 642. The arbitrated immediate torque 614 may be shaped by a manifold model calibrated to match the air flow characteristics of the engine. The arbitrated immediate torque 614 may therefore follow a trajectory similar to that of the estimated air torque 630. In various other implementations, the arbitrated immediate torque 614 may begin increasing between times 638 and 642 to provide a faster torque response to the driver tip-in.

At time 650, the estimated air torque 630 approaches the commanded predicted torque 626. For example only, the estimated air torque 630 may be within a predetermined range or percentage of the commanded predicted torque 626. Therefore, at time 650, control assumes that the lean air/fuel transient has concluded. Alternatively, control may assume that the lean air/fuel transient concludes a predetermined time period after time 642.

At time 650, because the lean air/fuel transient is determined to have concluded, the spark advance offset above the calibrated spark advance 646 is removed from the spark advance 634. In addition, the commanded immediate torque 618 decreases toward the arbitrated immediate torque 614. Although the spark advance offset is shown in FIG. 6 being removed abruptly at time 650, the spark advance offset may be removed in a gradual fashion, such as a ramp or a logarithmic decay. The torque reserve created between the commanded predicted torque 626 and the commanded immediate torque 618 re-creates the spark retard for catalyst light-off.

Figure 7:
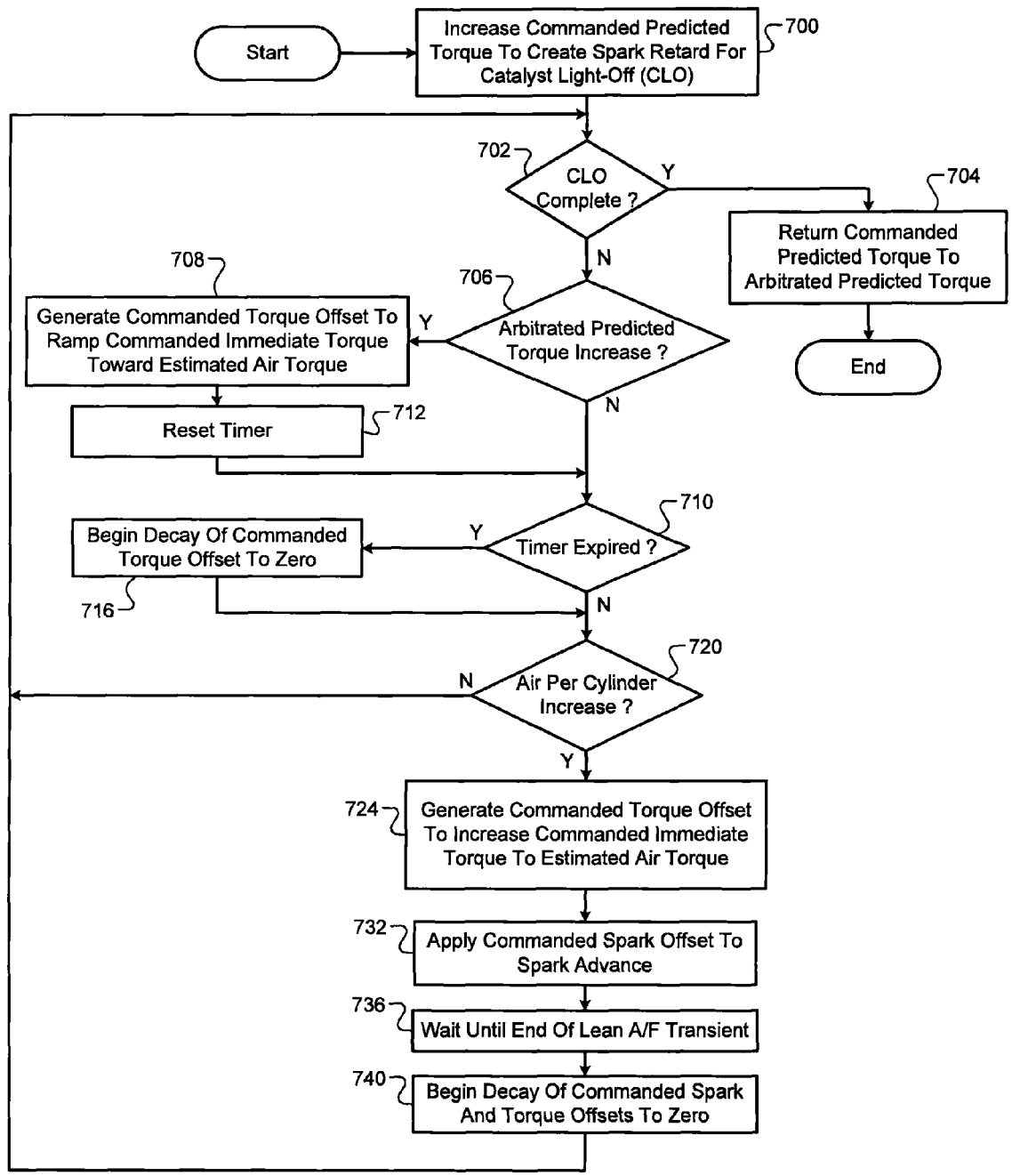
FIG. 7 is a flowchart depicting exemplary operation of the engine control module according to the principles of the present disclosure.

Referring now to FIG. 7, a flowchart depicts exemplary operation of the engine control module 114. Control begins in step 700 when the engine is started and catalyst light-off (CLO) is desired. In step 700, control increases the commanded predicted torque in order to create a large spark retard for CLO. In step 702, if CLO is complete, control transfers to step 704; otherwise, control continues in step 706. In step 704, control returns the commanded predicted torque to the arbitrated predicted torque plus any loads, such as air conditioning, and control ends.

In step 706, control determines whether an arbitrated predicted torque increase has occurred, such as one resulting from driver input. If so, a lean air/fuel transient is expected, and control transfers to step 708; otherwise, control transfers to step 710. In step 708, control begins ramping the commanded torque offset from zero to increase the commanded immediate torque toward the estimated air torque.

Control continues in step 712, where control resets a timer. Control continues in step 710, where control determines whether the timer has expired. The timer expires a predetermined period of time after being reset. When the timer expires, control assumes that the expected lean air/fuel transient will not occur and control transfers to step 716. Otherwise, control transfers to step 720.

In step 720, control determines whether an air per cylinder increase is greater than a predetermined threshold. If so, control transfers to step 724; otherwise, control returns to step 702. In step 724, control applies a commanded torque offset to the arbitrated immediate torque, which results in the commanded immediate torque increasing to approximately the level of the estimated air torque. By increasing the commanded immediate torque to the estimated air torque, the spark retard is removed, setting the spark advance to the calibrated spark advance value.

Control continues in step 732, where control applies a commanded spark offset to increase the spark advance beyond the calibrated optimum spark advance. Control continues in step 736, where control waits until an end of the lean air/fuel transient is detected. For example only, once a rate of change of the air per cylinder decreases below a predetermined threshold, control continues in step 740. In step 740, control begins to decay the launch torque offset and the launch spark offset to zero. Control then returns to step 702.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
an air control module that controls a throttle valve of an engine based on a commanded predicted torque;

a spark control module that controls spark advance of the engine based on a commanded immediate torque;
a torque control module that increases the commanded predicted torque when a catalyst light-off (CLO) mode is active, and that increases the commanded immediate torque when a driver actuates an accelerator input;
a transient detection module that generates a lean transient signal when an air per cylinder increase is detected while the CLO mode is active; and
a launch torque module that generates a torque offset signal based on the lean transient signal, wherein the torque control module increases the commanded immediate torque based on the torque offset signal.

2. The engine control system of claim 1 further comprising a launch spark module that generates a spark offset signal based on the lean transient signal, wherein the spark control module increases the spark advance based on the spark offset signal.

3. The engine control system of claim 2 further comprising a transient conclusion module that selectively generates a conclusion signal, wherein the launch torque module decreases the torque offset signal to zero based on the conclusion signal, and wherein the launch spark module decreases the spark offset signal to zero based on the conclusion signal.

4. The engine control system of claim 3 wherein the transient conclusion module generates the transient conclusion signal when a rate of the air per cylinder increase falls below a predetermined threshold.

5. The engine control system of claim 1 wherein the CLO mode is active when the engine is started and a catalyst system is below a threshold temperature.

6. The engine control system of claim 1 wherein, when the lean transient signal is generated, the launch torque module generates the torque offset signal in order to cause the spark control module to set the spark advance to a calibrated optimum value.

7. The engine control system of claim 6 wherein an estimated air torque of the engine gradually approaches the commanded predicted torque, and wherein, when the lean transient signal is generated, the launch torque module generates the torque offset signal based on a difference between the commanded immediate torque and the estimated air torque.

8. The engine control system of claim 1 further comprising a transient expectation module that generates a transient expected signal based on an increase in arbitrated predicted torque, wherein the torque control module controls the commanded predicted torque based on the arbitrated predicted torque, and wherein the launch torque module generates the torque offset signal as an increasing function based on the transient expected signal.

9. The engine control system of claim 8 wherein the launch torque module ramps the torque offset signal upward from approximately zero starting when the transient expected signal is generated, and wherein the launch torque module generates the torque offset signal based on a difference between the commanded immediate torque and an estimated air torque when the lean transient signal is generated.

10. The engine control system of claim 9 wherein the launch torque module decreases the torque offset signal to approximately zero when the transient expected signal is not generated within a predetermined time period after the lean transient signal was generated.

11. A method comprising:
controlling a throttle valve of an engine based on a commanded predicted torque;
controlling spark advance of the engine based on a commanded immediate torque;
increasing the commanded predicted torque when a catalyst light-off (CLO) mode is active;
increasing the commanded immediate torque when a driver actuates an accelerator input;
generating a lean transient signal when an air per cylinder increase is detected while the CLO mode is active;
generating a torque offset signal based on the lean transient signal; and
increasing the commanded immediate torque based on the torque offset signal.

12. The method of claim 11 further comprising:
generating a spark offset signal based on the lean transient signal; and
increasing the spark advance based on the spark offset signal.

13. The method of claim 12 further comprising:
selectively generating a conclusion signal;
decreasing the torque offset signal to zero based on the conclusion signal; and
decreasing the spark offset signal to zero based on the conclusion signal.

14. The method of claim 13 further comprising generating the transient conclusion signal when a rate of the air per cylinder increase falls below a predetermined threshold.

15. The method of claim 11 wherein the CLO mode is active when the engine is started and a catalyst system is below a threshold temperature.

16. The method of claim 11 further comprising, when the lean transient signal is generated, generating the torque offset signal in order to set the spark advance to a calibrated optimum value.

17. The method of claim 16 wherein an estimated air torque of the engine gradually approaches the commanded predicted torque, and further comprising, when the lean transient signal is generated, generating the torque offset signal based on a difference between the commanded immediate torque and the estimated air torque.

18. The method of claim 11 further comprising:
generating a transient expected signal based on an increase in arbitrated predicted torque;
controlling the commanded predicted torque based on the arbitrated predicted torque; and
generating the torque offset signal as an increasing function based on the transient expected signal.

19. The method of claim 18 further comprising:
ramping the torque offset signal upward from approximately zero starting when the transient expected signal is generated; and
generating the torque offset signal based on a difference between the commanded immediate torque and an estimated air torque when the lean transient signal is generated.

20. The method of claim 19 further comprising decreasing the torque offset signal to approximately zero when the transient expected signal is not generated within a predetermined time period after the lean transient signal was generated.

* * * * *